United States Patent
Thakkar et al.

(10) Patent No.: US 10,318,518 B2
(45) Date of Patent: Jun. 11, 2019

(54) EVENT NOTIFICATION TOOL

(71) Applicant: Bank of America Corporation, Charlotte, NC (US)

(72) Inventors: Ankit Dipakkumar Thakkar, Charlotte, NC (US); Mohamed Niyas Liyakkath Ali, Tamil Nadu (IN); Bhanu Prakash Banala, Charlotte, NC (US); Andrew McCullough, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 337 days.

(21) Appl. No.: 14/814,902

(22) Filed: Jul. 31, 2015

(65) Prior Publication Data

US 2017/0032009 A1    Feb. 2, 2017

(51) Int. Cl.
*G06F 16/23*     (2019.01)
(52) U.S. Cl.
CPC ................... *G06F 16/2358* (2019.01)
(58) Field of Classification Search
None
See application file for complete search history.

(56) References Cited

U.S. PATENT DOCUMENTS

| | | | |
|---|---|---|---|
| 2005/0038818 A1* | 2/2005 | Hooks | G06F 11/0748 |
| 2007/0220065 A1* | 9/2007 | Coyle | G06F 17/30306 |
| 2010/0130172 A1* | 5/2010 | Vendrow | G06Q 20/32 |
| | | | 455/411 |
| 2014/0365443 A1* | 12/2014 | Goel | G06F 11/1469 |
| | | | 707/679 |
| 2015/0347552 A1* | 12/2015 | Habouzit | G06F 17/30578 |
| | | | 707/613 |
| 2015/0366518 A1* | 12/2015 | Sampson | A61B 5/7221 |
| | | | 600/301 |
| 2016/0034481 A1* | 2/2016 | Kumarasamy | G06F 17/30088 |
| | | | 707/639 |

* cited by examiner

*Primary Examiner* — Sherief Badawi
*Assistant Examiner* — Raheem Hoffler
(74) *Attorney, Agent, or Firm* — Michael A. Springs

(57) ABSTRACT

According to one embodiment, a system includes an event processing module, a notification controller, and a publication manager. The event processing module includes listeners configured to generate a snapshot of a database. The event processing module also includes an event processor configured to compare the snapshot with a stored historical snapshot to determine data elements in the database that changed, to generate a message indicating the plurality of changes, and to push the message to a queue. The notification controller is configured to receive the message from the queue, to determine, based on stored publication rules, a change from the plurality of changes that should be published, and to format the change based on stored format rules. The publication manager is configured to receive the formatted change, to determine, based on stored subscriptions, whether the formatted change should be communicated to a client, and to communicate the change.

6 Claims, 3 Drawing Sheets

EVENT NOTIFICATION TOOL

TECHNICAL FIELD

This disclosure relates generally to a tool for event notification.

BACKGROUND

Certain enterprises may include several units that operate separately from each other. When certain events occur, these units may need to be notified of these events.

SUMMARY OF THE DISCLOSURE

According to one embodiment, a system includes an event processing module, a notification controller, and a publication manager. The event processing module includes a plurality of listeners configured to generate a snapshot of data in a database. The event processing module also includes an event processor configured to compare the snapshot with a stored historical snapshot to determine a plurality of data elements in the database that changed, to generate a message indicating the plurality of changes, and to push the message to an asynchronous queue. The notification controller is configured to receive the message from the asynchronous queue, to determine, based on stored publication rules, a change from the plurality of changes indicated by the message that should be published, and to format the change based on stored format rules. The publication manager is configured to receive the formatted change, to determine, based on stored subscriptions, whether the formatted change should be communicated to a client, and to communicate the change to the client.

According to another embodiment, a method includes generating, by a plurality of listeners, a snapshot of data in a database and comparing, by an event processor, the snapshot with a stored historical snapshot to determine a plurality of data elements in the database that changed. The method further includes generating a message indicating the plurality of changes and pushing the message to an asynchronous queue. The method also includes determining, based on stored publication rules, a change from the plurality of changes indicated by the message that should be published and formatting the change based on stored format rules. The method further includes determining, based on stored subscriptions, whether the formatted change should be communicated to a client and communicating the change to the client.

According to another embodiment, an apparatus includes a memory and a processor communicatively coupled to the memory. The processor is configured to generate a snapshot of data in a database and to compare the snapshot with a stored historical snapshot to determine a plurality of data elements in the database that changed. The processor is further configured to generate a message indicating the plurality of changes and to push the message to an asynchronous queue. The processor is also configured to determine, based on stored publication rules, a change from the plurality of changes indicated by the message that should be published and to format the change based on stored format rules. The processor is further configured to determine, based on stored subscriptions, whether the formatted change should be communicated to a client and to communicate the change to the client.

Certain embodiments may provide one or more technical advantages. For example, an embodiment may reduce the amount of wasted processing resources caused by implementing redundant listeners. As another example, an embodiment may improve network efficiency by reducing the amount of traffic caused by redundant listeners. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
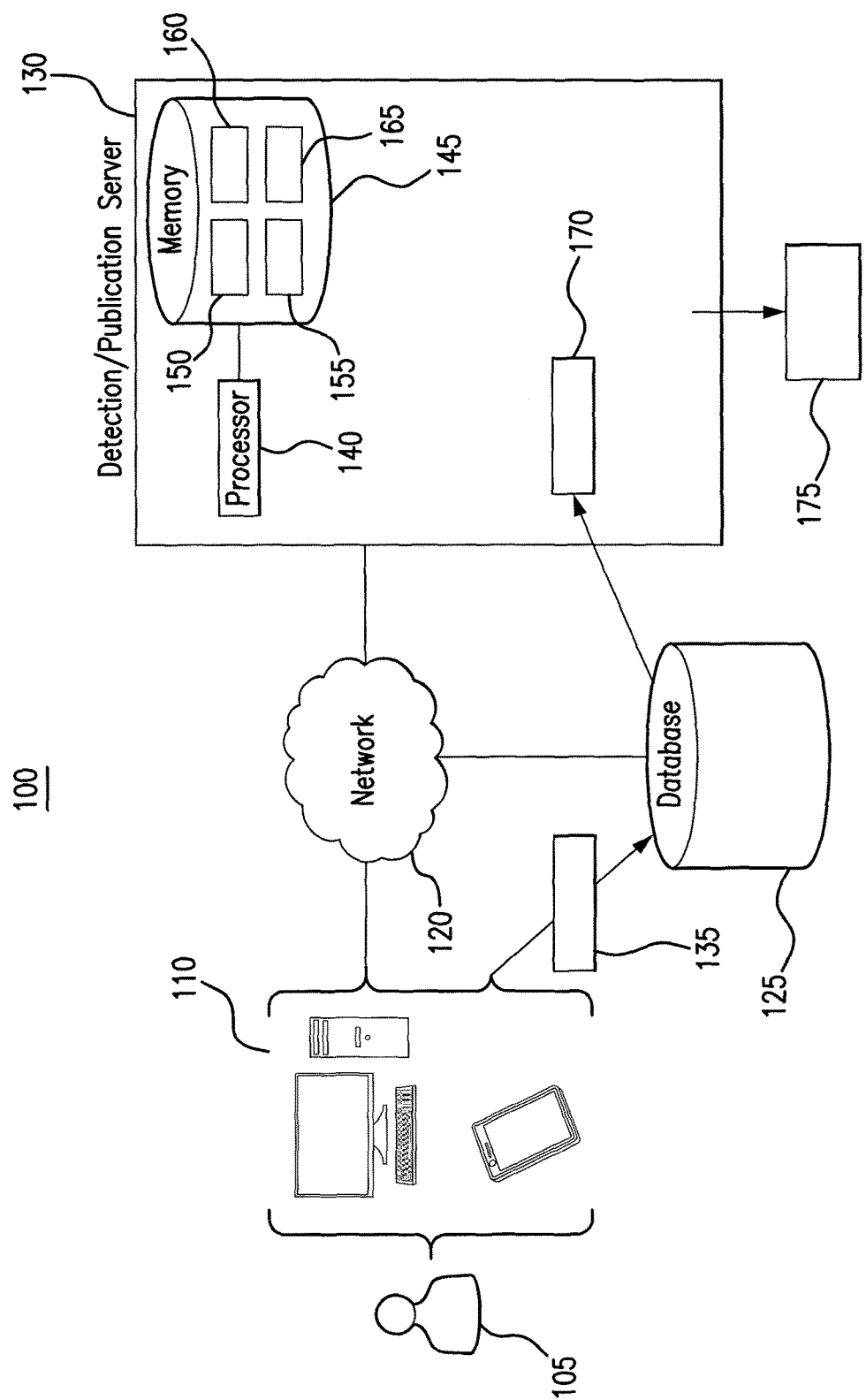
FIG. 1 illustrates a system for event notification.
Figure 2:
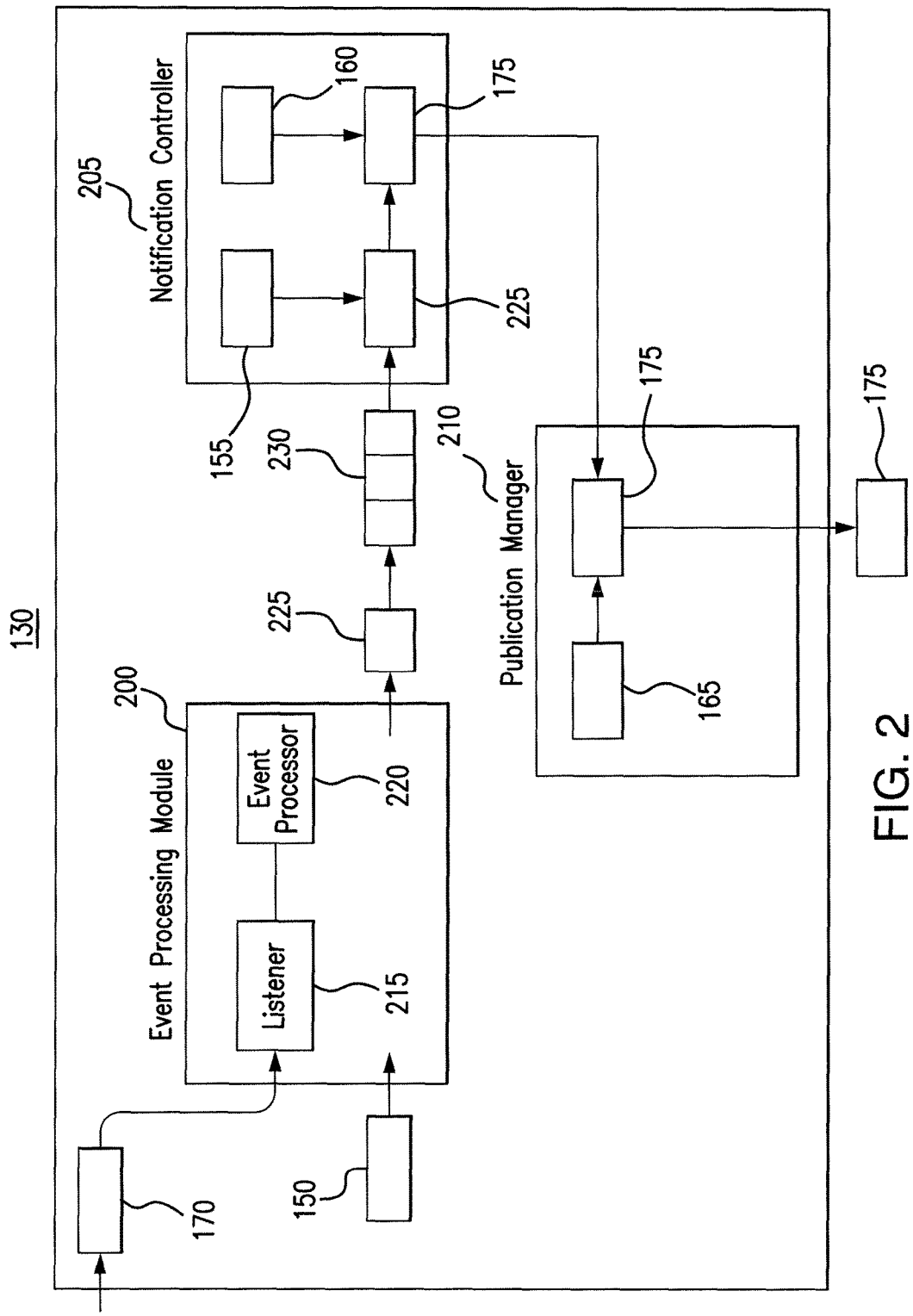
FIG. 2 illustrates the detection/publication server of the system of FIG. 1.
Figure 3:
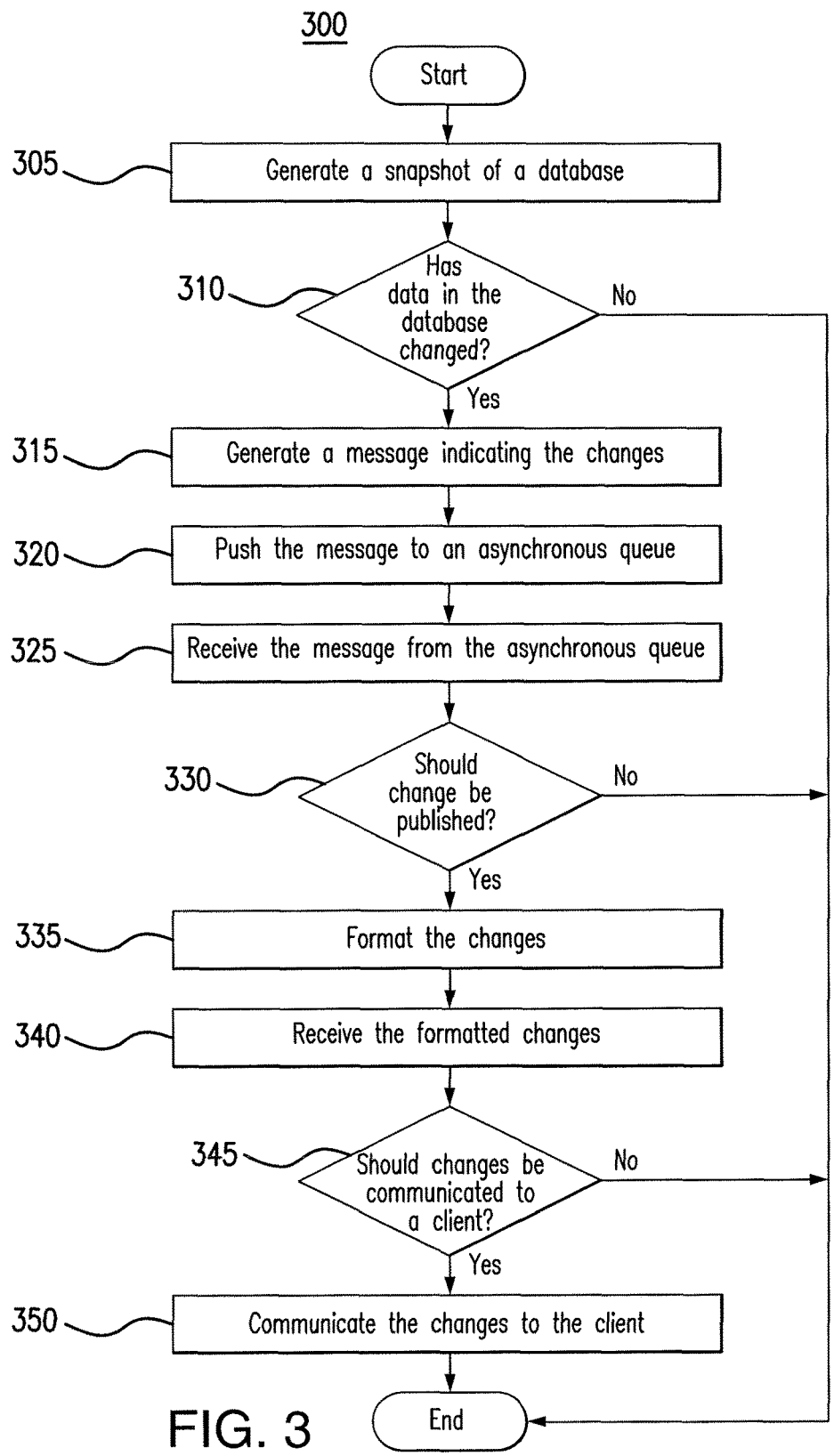
FIG. 3 is a flowchart illustrating a method for event notification using the system of FIG. 1.

Embodiments of the present disclosure and its advantages are best understood by referring to FIGS. 1 through 3 of the drawings, like numerals being used for like and corresponding parts of the various drawings.

Certain enterprises may include several units that operate separately from each other. For example, these enterprises may include front-end business units, back-end business units, fraud departments, IT departments, technology departments, human resources departments, etc. When certain events occur these units may need to be notified of these events. For example, if a user changes contact information stored with the enterprise, then the fraud department may need to be notified of the contact information change to determine whether the change was fraudulent. As another example, if an employee changes contact information then the human resources department may need to be notified to update its records. One way for each unit to be notified of certain events is for each unit to implement its own listener. Each listener may monitor for events and report to the unit any event that is relevant to the unit. However, for each unit to implement its own listener leads to redundancy which causes processing resources and network resources to be wasted.

This disclosure provides a system that listens for and detects events. When an event is detected, the system may determine whether the event should be published to certain units. The system may format the event or any communication to the unit so that it may be appropriately received by the unit. The system may then communicate the event to the unit.

As an example, a user may change his contact information stored with the enterprise. The system may detect the contact information change. The system may then determine that the fraud department should be notified of the contact information change. The system may determine a format for reporting changes to the fraud department and format the contact information change appropriately. The system may then communicate the change to the fraud department so that the fraud department can determine whether the contact information change is fraudulent. In this manner, the system may reduce the amount of processing resources and/or network resources used to detect and communicate events to various units. A more detailed description of the system is provided using FIGS. 1 through 3.

FIG. 1 illustrates a system 100 for event notification. As provided by FIG. 1, system 100 includes a device 110, a network 120, a database 125, and a detection/publication server 130. Device 110, database 125, and detection/publication server 130 may be communicatively coupled to each other through network 120.

A user 105 may use device 110 to communicate with other components of system 100. By interacting with device 110, user 105 may cause a detectable event to occur. This disclosure contemplates device 110 being any appropriate device for sending and receiving communications over network 120. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

User 105 may use device 110 to cause an event to occur. For example, user 105 may use device 110 to communicate a change 135 to database 125. When database 125 receives change 135, database 125 may update and/or change information stored in database 125. As an example, user 105 may use device 110 to update contact information for user 105. When user 105 changes the contact information, device 110 may communicate the change 135 to database 125. Database 125 may store the contact information of user 105. When database 125 receives change 135, database 125 may change the contact information for user 105 stored in database 125. This disclosure contemplates device 110 causing any type of event or change.

Network 120 may facilitate communication between and amongst the components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Detection/publication server 130 may detect that an event occurred and publish the event to the appropriate units. As illustrated in the example of FIG. 1, detection/publication server 130 may send and receive information to and from device 110, network 120, and database 125. Detection/publication server 130 may include a processor 140 and a memory 145. Processor 140 may be communicatively coupled to memory 145. This disclosure contemplates processor 140 and memory 145 being configured to perform any of the functions of detection/publication server 130 described herein.

Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Processor 140 may execute software stored on memory 145 to perform any of the functions described herein. Processor 140 may control the operation and administration of detection/publication server 130 by processing information received from network 120, database 125, and memory 145. Processor 140 may include any hardware and/or software that operates to control and process information. Processor 140 may be a programmable logic device, a microcontroller, a microprocessor, any suitable processing device, or any suitable combination of the preceding.

Detection/publication server 130 may listen for events and/or changes. In particular embodiments, detection/publication server 130 may detect events and/or changes by periodically generating a snapshot 170 of database 125. Detection/publication server 130 may generate snapshots 170 at defined intervals, such as for example, every two minutes. After generating snapshot 170, detection/publication server 130 may compare snapshot 170 with a previous snapshot 150 to determine whether information in database 125 has changed. If information in database 125 has not changed, detection/publication server 130 may determine that no event and/or change has occurred. In particular embodiments, previous snapshot 150 may be stored in database 125 and retrieved by detection/publication server 130.

If detection/publication server 130 determines that information in database 125 has changed, detection/publication server 130 may then determine whether the change should be published based on stored publication rules 155. The publication rules 155 may indicate the types of changes that should be published. For example, if stored publication rules 155 indicate that changes to contact information should be published and detection/publication server 130 determines that user 105 has changed contact information in database 125, detection/publication server 130 may determine that this change should be published.

In particular embodiments, detection/publication server 130 may add data to a change based on stored publication rules 155. For example, stored publication rules 155 may indicate that contact information changes should be accompanied by prior contact information and a location of user 105 when published. In response, detection/publication server 130 may add previous contact information and a location of user 105 to a contact information change.

If detection/publication server 130 determines that the change should be published, detection/publication server 130 may then determine an appropriate format for the change based on stored format rules 160. In particular embodiments, detection/publication server 130 may format the change based on the needs or requirements of the unit to which the change will be published. For example, stored format rules 160 may indicate that the publication should be formatted to JavaScript Object Notation or Extensible Markup Language. Detection/publication server 130 may determine, based on format rules 160, that the unit needs to receive published changes in JavaScript Object Notation or Extensible Markup Language. In that instance, detection/ publication server 130 may format the change to JavaScript Object Notation or Extensible Markup Language. This disclosure contemplates detection/publication server 130 formatting the change into any appropriate format.

Detection/publication server 130 may determine which units should receive the published changes based on subscriptions 165. Detection/publication server 130 may publish the changes to the units specified in stored subscriptions 165. For example, subscriptions 165 may indicate that contact information changes should be published to the fraud unit to determine whether a contact information change is fraudulent. Based on that subscription 165, detection/publication server 130 may publish a contact information change to the fraud unit. Detection/publication server 130 may communicate the formatted change 175 to the unit indicated by stored subscriptions 165. In particular embodiments, subscriptions 165 may have been created by the units.

In particular embodiments, system 100 may reduce the need for every unit of an enterprise to maintain its own listener to determine when events occur. In this manner, system 100 may reduce the processing resources and network resources used to operate these redundant listeners. The operation of detection/publication server 130 will be described in more detail using FIG. 2.

FIG. 2 illustrates the detection/publication server 130 of the system 100 of FIG. 1. As illustrated in FIG. 2, detection/publication server 130 may include an event processing module 200, a notification controller 205, and a publication manager 210. This disclosure contemplates processor 140 and memory 145 implementing each of these components of detection/publication server 130. This disclosure further contemplates detection/publication server 130 being implemented in a distributed manner. For example, this disclosure contemplates event processing module 200 being implemented in a first server with a processor and a memory and notification controller 205 being implemented in another server with another processor and another memory. Furthermore, this disclosure contemplates publication manager 210 being implemented in another server with another processor and another memory. Each of these servers may be communicatively coupled to each other.

Event processing module 200 may include a listener 215 and an event processor 220. This disclosure contemplates event processing module 200 including any number of listeners 215 and any number of event processors 220. For example, event processing module 200 may include a primary listener 215 and a secondary listener 215. When the primary listener 215 fails or does not operate correctly, the secondary listener 215 may operate in place of the primary listener 215. The secondary listener 215 may also communicate an alert to an administrator to notify the administrator that the primary listener 215 is not operating correctly.

Listener 215 may generate snapshot 170 of database 125. Snapshot 170 may indicate the data and/or information in database 125 at a certain time. Event processor 220 may then compare snapshot 170 with a previous snapshot 150. If event processor 220 determines, based on the comparison, that information and/or data in database 125 has changed, event processor 220 may generate a message 225 indicating the changes. Event processor 220 may then push message 225 to a queue 230. In particular embodiments, queue 230 may be an asynchronous queue.

As an example, if user 105 changed contact information in database 125 then snapshot 170 would indicate the new contact information. Event processor 220 may then compare snapshot 170 with snapshot 150. The previous snapshot 150 may indicate the old contact information. Based on the comparison, event processor 220 may determine that the contact information in database 125 has changed. When event processor 220 determines that information in database 125 has changed, event processor 220 may generate a message 225 indicating the change and any other changes detected. Event processor 220 may then push message 225 to a queue 230.

Notification controller 205 may pull and/or receive message 225 from queue 230. Notification controller 205 may then determine whether changes indicated by message 225 should be published. In particular embodiments, notification controller 205 may make this determination based on stored publication rules 155. If notification controller 205 determines that a change should be published, notification controller 205 may then format the change based on stored format rules 160. After formatting, notification controller 205 may communicate formatted change 175 to publication manager 210. In particular embodiments, notification controller 205 may instead push formatted change 175 into another queue.

Publication manager 210 may receive formatted change 175 from notification controller 205. In certain embodiments, publication manager 210 may pull and/or receive formatted change 175 from a queue. Publication manager 210 may determine a client to which the formatted change 175 should be sent based on stored subscriptions 165. For example, stored subscriptions 165 may indicate that contact information changes should be communicated to the fraud department to determine if the contact information change was fraudulent. In response, publication manager 210 may communicate the formatted change to the fraud department. This disclosure contemplates publication manager 210 communicating any change to any appropriate unit and/or client.

Modifications, additions, or omissions may be made to system 100 without departing from the scope of the invention. For example, detection/publication server 130 may be a distributed server. As another example, the components of system 100 may be integrated or separated. For example, database 125 may be incorporated into detection/publication server 130.

FIG. 3 is a flowchart illustrating a method 300 for event notification using the system 100 of FIG. 1. In particular embodiments, detection/publication server 130 may perform method 300. In step 305, detection/publication server 130 may generate a snapshot of a database. The snapshot may indicate the information and/or data in the database at a point in time. In step 310, detection/publication server 130 may determine if data in the database has changed. In particular embodiments, detection/publication server 130 may make this determination by comparing the snapshot with a previous snapshot of the database. If data in the database has not changed, detection/publication server 130 may conclude.

If detection/publication server 130 determines that data in the database has changed, detection/publication server 130 may proceed to step 315 to generate a message indicating the changes. The message may indicate any changes in the database. In step 320, detection/publication server 130 may push the message to an asynchronous queue. In step 325, detection/publication server 130 may pull and/or receive the message from the asynchronous queue.

In step 330, detection/publication server 130 may determine whether the changes should be published. In particular embodiments, detection/publication server 130 may make this determination based on stored publication rules. For example, the stored publication rules may indicate that contact information changes should be published. As a result of that rule, if detection/publication server 130 determines that contact information in the database has changed, then detection/publication server 130 may determine that those changes should be published.

If detection/publication server 130 determines that the changes should not be published, detection/publication server 130 may conclude. If detection/publication server 130 determines that the changes should be published, detection/publication server 130 may format the changes in step 335. In particular embodiments, detection/publication server may format the changes based on stored format rules. Detection/publication server 130 may then push and/or send the formatted changes.

In step 340, detection/publication server 130 may pull and/or receive the formatted changes. In particular embodiments, detection/publication server 130 may pull and/or receive the formatted changes from a queue. In step 345, detection/publication server 130 may determine whether the changes should be communicated to a client or a unit. In particular embodiments, detection/publication server 130 may make this determination based on stored subscriptions. If detection/publication server 130 determines that the changes should not be communicated to a client, detection/publication server 130 may conclude. If detection/publication server 130 determines that the changes should be communicated, detection/publication server 130 may proceed to step 350 and communicate the changes to the client.

Modifications, additions, or omissions may be made to method 300 depicted in FIG. 3. Method 300 may include more, fewer, or other steps. For example, steps may be performed in parallel or in any suitable order. While discussed as detection/publication server 130 performing the steps, any suitable component of system 100, such as device 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
    an event processing module implemented in a processor communicatively coupled to a memory, the event processing module comprising:
        a plurality of listeners configured to generate a snapshot of data in a database, the plurality of listeners comprises a primary listener and a secondary listener, the secondary listener configured to operate in place of the primary listener if the primary listener fails and to communicate an alert to indicate that the primary listener failed; and
        an event processor configured to:
            compare the snapshot with a stored historical snapshot to determine contact information in the database may have been fraudulently changed;
            generate a message indicating the changed contact information; and
            push the message to an asynchronous queue;
    a notification controller implemented in the processor, the notification controller configured to:
        receive the message from the asynchronous queue;
        determine, based on stored publication rules, that the changed contact information should be published, the stored publication rules indicating that changes to contact information should be published and that previous contact information for a user and a location of the user should be added to the changed contact information;
        format the changed contact information based on stored format rules by formatting the changed contact information into one or more of JavaScript Object Notation and Extensible Markup Language; and
        add previous contact information for the user and the location of the user to the changed contact information based on the stored publication rules; and
    a publication manager implemented in the processor, the publication manager configured to:
        receive the formatted changed contact information;
        determine, based on stored subscriptions, whether the formatted changed contact information should be communicated to a client;
        communicate the change to the client, the client configured to determine whether the changed contact information was fraudulently changed.

2. The system of claim 1, wherein the plurality of listeners are configured to generate a snapshot of data in the database at defined intervals.

3. A method comprising:
    generating, by a plurality of listeners, a snapshot of data in a database, the plurality of listeners comprises a primary listener and a secondary listener, the secondary listener configured to operate in place of the primary listener if the primary listener fails and to communicate an alert to indicate that the primary listener failed;
    comparing, by an event processor, the snapshot with a stored historical snapshot to determine contact information in the database may have been fraudulently changed;
    generating a message indicating the changed contact information;
    pushing the message to an asynchronous queue;
    determining, based on stored publication rules, that the changed contact information should be published, the stored publication rules indicating that changes to contact information should be published and that previous contact information for a user and a location of the user should be added to the changed contact information;
    formatting the changed contact information based on stored format rules by formatting the changed contact information into one or more of JavaScript Object Notation and Extensible Markup Language;
    adding previous contact information for the user and the location of the user to the changed contact information based on the stored publication rules;
    determining, based on stored subscriptions, whether the formatted changed contact information should be communicated to a client;
    communicating the change to the client, the client configured to determine whether the changed contact information was fraudulently changed.

4. The method of claim 3, wherein the plurality of listeners are configured to generate a snapshot of data in the database at defined intervals.

5. An apparatus comprising:
    a memory; and
    a processor communicatively coupled to the memory, the processor configured to:
        generate a snapshot of data in a database, the plurality of listeners comprises a primary listener and a secondary listener, the secondary listener configured to operate in place of the primary listener if the primary listener fails and to communicate an alert to indicate that the primary listener failed;

compare the snapshot with a stored historical snapshot to determine contact information in the database may have been fraudulently changed;

generate a message indicating the changed contact information; and push the message to an asynchronous queue;

determine, based on stored publication rules, that the changed contact information should be published, the stored publication rules indicating that changes to contact information should be published and that previous contact information for a user and a location of the user should be added to the changed contact information;

format the changed contact information based on stored format rules by formatting the changed contact information into one or more of JavaScript Object Notation and Extensible Markup Language;

add previous contact information for the user and the location of the user to the changed contact information based on the stored publication rules;

determine, based on stored subscriptions, whether the formatted changed contact information should be communicated to a client;

communicate the change to the client, the client configured to determine whether the changed contact information was fraudulently changed.

6. The apparatus of claim 5, wherein the processor is further configured to generate a snapshot of data in the database at defined intervals.

* * * * *